United States Patent
Brown et al.

(10) Patent No.: US 8,632,653 B2
(45) Date of Patent: Jan. 21, 2014

(54) METHOD OF MANUFACTURING CURVED COMPOSITE STRUCTURAL ELEMENTS

(75) Inventors: Todd A. Brown, Olympia, WA (US); Stephen Douglas Friddell, Issaquah, WA (US); Christopher G. Harris, Auburn, WA (US); Andrew E. Modin, Enumclaw, WA (US)

(73) Assignee: The Boeing Company, Chicago, IL (US)

( * ) Notice: Subject to any disclaimer, the term of this patent is extended or adjusted under 35 U.S.C. 154(b) by 1047 days.

(21) Appl. No.: 11/119,756

(22) Filed: May 3, 2005

(65) Prior Publication Data

US 2006/0249868 A1    Nov. 9, 2006

(51) Int. Cl.
  *B29C 65/00*  (2006.01)
  *B27N 3/10*  (2006.01)
  *B32B 9/04*  (2006.01)

(52) U.S. Cl.
  USPC ........ 156/304.1; 156/196; 156/264; 264/235; 264/236; 264/257; 264/258

(58) Field of Classification Search
  USPC .......... 264/137, 258, 257, 235, 236; 156/166, 156/173, 196, 245, 285, 264, 304.1
  See application file for complete search history.

(56) References Cited

U.S. PATENT DOCUMENTS

| | | | |
|---|---|---|---|
| 3,042,562 A | | 7/1962 | Peterson |
| 3,259,021 A | | 7/1966 | Appleton et al. |
| 3,556,922 A | * | 1/1971 | Green et al. ............ 428/98 |
| 3,775,219 A | * | 11/1973 | Karlson et al. ............ 156/363 |
| 4,133,711 A | * | 1/1979 | August et al. ............ 156/353 |
| 4,208,238 A | * | 6/1980 | August et al. ............ 156/510 |
| 4,249,704 A | | 2/1981 | Sakaue et al. |
| 4,305,903 A | * | 12/1981 | Krause ............ 264/258 |
| 4,475,976 A | * | 10/1984 | Mittelstadt et al. ............ 156/286 |

(Continued)

FOREIGN PATENT DOCUMENTS

| | | |
|---|---|---|
| DE | 3223231 A1 | 1/1983 |
| DE | 3249987 C2 | 8/1995 |

(Continued)

OTHER PUBLICATIONS

Dickson, J.N. and S.B. Biggers, Design and Analysis of a Stiffened Composite Fuselage Panel, NASA Contractor Report 159302, Aug. 1980, 46 pages.*

(Continued)

*Primary Examiner* — Atul P. Khare
(74) *Attorney, Agent, or Firm* — Yee & Associates, P.C.

(57) ABSTRACT

A method of manufacturing curved composite structural elements can include fabricating a web ply in a flat curve over a removable substrate and laying up the ply on a curved web surface of a manufacturing tool. The method also can include laying up a diagonal ply with fibers oriented at +/−45° from the centerline of the web surface. The method further can include cutting a unidirectional composite tape into segments and laying up the tape segments to form a cross ply with a fiber orientation normal to the centerline of the web surface. One or both edges of the diagonal and cross plies may be folded over one or two sides of the manufacturing tool to form one or two flange surfaces. Additionally, a cap ply can be laid up on one or both flange surfaces using composite tape. The structural element layup can then be inspected and any excess composite material can be trimmed away.

25 Claims, 5 Drawing Sheets

(56) References Cited

U.S. PATENT DOCUMENTS

| | | | |
|---|---|---|---|
| 4,541,886 A * | 9/1985 | Marlow et al. | 156/230 |
| 4,576,849 A | 3/1986 | Gardiner | |
| 4,588,466 A * | 5/1986 | Eaton | 156/235 |
| 4,591,402 A | 5/1986 | Evans et al. | |
| 4,696,707 A * | 9/1987 | Lewis et al. | 156/64 |
| 4,707,214 A | 11/1987 | Nithart et al. | |
| 4,720,255 A * | 1/1988 | Mittelstadt | 425/394 |
| 4,726,924 A | 2/1988 | Mittelstadt | |
| 4,750,965 A * | 6/1988 | Pippel et al. | 156/361 |
| 4,847,063 A | 7/1989 | Smith | |
| 4,867,834 A | 9/1989 | Alenskis et al. | |
| 4,955,803 A * | 9/1990 | Miller et al. | 425/145 |
| 5,038,291 A * | 8/1991 | Wang et al. | 700/98 |
| 5,242,523 A | 9/1993 | Willden et al. | |
| 5,292,475 A * | 3/1994 | Mead et al. | 264/257 |
| 5,431,749 A * | 7/1995 | Messner | 156/358 |
| 5,431,984 A | 7/1995 | Keck et al. | |
| 5,492,979 A * | 2/1996 | Pater | 525/421 |
| 5,538,589 A * | 7/1996 | Jensen et al. | 156/581 |
| 5,648,109 A * | 7/1997 | Gutowski et al. | 425/504 |
| 6,355,133 B1 | 3/2002 | Williams | |
| 6,451,152 B1 | 9/2002 | Holmes et al. | |
| 6,595,467 B2 | 7/2003 | Schmidt | |
| 6,613,258 B1 | 9/2003 | Maison et al. | |
| 6,723,271 B2 | 4/2004 | Hemphill et al. | |
| 7,008,580 B2 | 3/2006 | Eberth et al. | |
| 7,056,402 B2 | 6/2006 | Koerwien et al. | |
| 7,115,180 B2 | 10/2006 | Bruyere | |
| 7,134,629 B2 | 11/2006 | Johnson et al. | |
| 7,137,182 B2 | 11/2006 | Nelson | |
| 7,175,795 B2 | 2/2007 | Eberth et al. | |
| 7,469,735 B2 | 12/2008 | Brown et al. | |
| 7,513,769 B2 | 4/2009 | Benson et al. | |
| 7,527,222 B2 | 5/2009 | Biornstad et al. | |
| 7,670,525 B2 | 3/2010 | Weidmann et al. | |
| 7,790,082 B2 | 9/2010 | Buge et al. | |
| 7,842,145 B2 | 11/2010 | Hogg | |
| 7,943,076 B1 | 5/2011 | Hawkins et al. | |
| 2002/0149134 A1 | 10/2002 | Hemphill et al. | |
| 2003/0168775 A1 | 9/2003 | Eberth et al. | |
| 2003/0173019 A1 | 9/2003 | Eberth et al. | |
| 2004/0074587 A1 | 4/2004 | Koerwien et al. | |
| 2005/0056362 A1 | 3/2005 | Benson et al. | |
| 2005/0067731 A1 | 3/2005 | Bruyere | |
| 2005/0263645 A1 * | 12/2005 | Johnson et al. | 244/119 |
| 2006/0073309 A1 | 4/2006 | Hogg | |
| 2006/0216480 A1 | 9/2006 | Weidmann et al. | |
| 2006/0216490 A1 | 9/2006 | Ishii et al. | |
| 2007/0029038 A1 | 2/2007 | Brown et al. | |
| 2007/0161483 A1 | 7/2007 | Raf et al. | |
| 2008/0230652 A1 * | 9/2008 | Biornstad et al. | 244/120 |
| 2009/0261199 A1 | 10/2009 | McCarville et al. | |
| 2009/0263618 A1 | 10/2009 | McCarville et al. | |
| 2011/0097554 A1 | 4/2011 | Kehrl et al. | |
| 2012/0076973 A1 | 3/2012 | Guzman et al. | |

FOREIGN PATENT DOCUMENTS

| | | |
|---|---|---|
| EP | 0496695 A2 | 7/1992 |
| EP | 1800840 A1 | 6/2007 |
| EP | 1804146 A1 | 7/2007 |
| EP | 1995040 A1 | 11/2008 |
| EP | 1995046 A2 | 11/2008 |
| EP | 2233625 A1 | 9/2010 |
| FR | 2515106 A1 | 4/1983 |
| FR | 2635484 A1 | 2/1990 |
| GB | 763972 A | 12/1956 |
| GB | 2467417 A | 8/2010 |
| JP | 2003317547 A | 11/2003 |
| JP | 2004276393 A | 10/2004 |
| WO | 9922932 A1 | 5/1999 |
| WO | WO 03/099545 A1 | 12/2003 |
| WO | 2005011961 A1 | 2/2005 |
| WO | WO2006070015 A1 | 7/2006 |
| WO | 2006119002 A2 | 11/2006 |
| WO | WO2006136560 A1 | 12/2006 |
| WO | 2007018935 A1 | 2/2007 |
| WO | 2009129007 A2 | 10/2009 |
| WO | 2010101741 A2 | 9/2010 |

OTHER PUBLICATIONS

Biornstad et al., U.S. Appl. No. 10/851,381 entitled "Composite Barrel Sections For Aircraft Fuselages And Other Structures, And Methods And Systems For Manufacturing Such Barrel Sections," filed May 20, 2004, whole document.

Johnson et al., U.S. Appl. No. 10/853,075 entitled "Structural Panels For Use In Aircraft Fuselages And Other Structures," filed May 25, 2004, whole document.

International Search Report, The Boeing Company, May 12, 2010.

"Fabrics and performs" In: D.B. Miracle & S.L. Donaldson: "Composites". Dec. 2001, ASM International, USA, ISBN: 0871707039, vol. 21, pp. 64-65.

EPO Office Action, Application No. 06769909.0-2307, Reference No. P95576EP00, Oct. 2009.

USPTO Notice of Allowance, dated Aug. 17, 2012, regarding U.S. Appl. No. 12/776,781, 10 pages.

International Search Report dated Oct. 31, 2006, regarding Application No. PCT/US2006/027067 (WO2007018935), 2 pages.

International Search Report dated Feb. 15, 2007, regarding Application No. PCT/US2006/016191 (WO2006119002), 6 pages.

International Search Report dated Oct. 29, 2009, regarding Application No. PCT/US2009/037073 (WO2009129007), 4 pages.

International Search Report dated Nov. 5, 2010, regarding Application No. PCT/US2010/025110 (WO2010101741), 3 pages.

Shirinzadeh et al., Trajectory for Open-Contoured Structures in Robotic Fibre Placement, Robotics and Computer-Integrated Manufacturing, 23(4):380-394, Mar. 2007.

USPTO Office Action, dated Mar. 5, 2008, regarding U.S. Appl. No. 11/195,786, 15 pages.

USPTO Notice of Allowance, dated Aug. 25, 2008, regarding U.S. Appl. No. 11/195,786, 7 pages.

USPTO Office Action, dated Feb. 9, 2011, regarding U.S. Appl. No. 12/104,529, 17 pages.

USPTO Final Office Action, dated Oct. 28, 2011, regarding U.S. Appl. No. 12/104,529, 12 pages.

USPTO Office Action, dated Nov. 8, 2010, regarding U.S. Appl. No. 12/363,746, 17 pages.

Response to Office Action, dated Mar. 14, 2011, regarding U.S. Appl. No. 12/363,746, 15 pages.

USPTO Notice of Allowance, dated Mar. 29, 2011, regarding U.S. Appl. No. 12/363,746, 8 pages.

USPTO Office Action, dated Jul. 19, 2011, regarding U.S. Appl. No. 12/396,418, 12 pages.

USPTO Final Office Action, dated Dec. 30, 2011, regarding U.S. Appl. No. 12/396,418, 9 pages.

USPTO Office Action, dated Oct. 18, 2011, regarding U.S. Appl. No. 12/776,781, 15 pages.

USPTO final office action dated May 16, 2012 regarding U.S. Appl. No. 12/776,781, 26 Pages.

International Search Report, dated Apr. 16, 2012, regarding Application No. PCT/US2011/066763, 13 pages.

Klenner, "Evaluation and Selection Algorithms of Cost-Optimised Prepreg Application Methods in the Context of Manufacturing Highly Stressed Aircraft Components of Fibre-Reinforced Plastic," Doctoral Dissertation, Technische Universität Carolo-Wilhelmina zu Braunschweig (DE), Apr. 5, 1988, pp. 9, 18-25, 55-56, 64-68, & 154-156.

Office Action, dated Jun. 3, 2013, regarding USPTO U.S. Appl. No. 13/684,988, 25 pages.

Office Action, dated May 23, 2013, regarding USPTO U.S. Appl. No. 13/013,097, 42 pages.

International Preliminary Report on Patentability, dated Jul. 30, 2013, regarding Application No. PCT/US2011/066763, 6 pages.

* cited by examiner

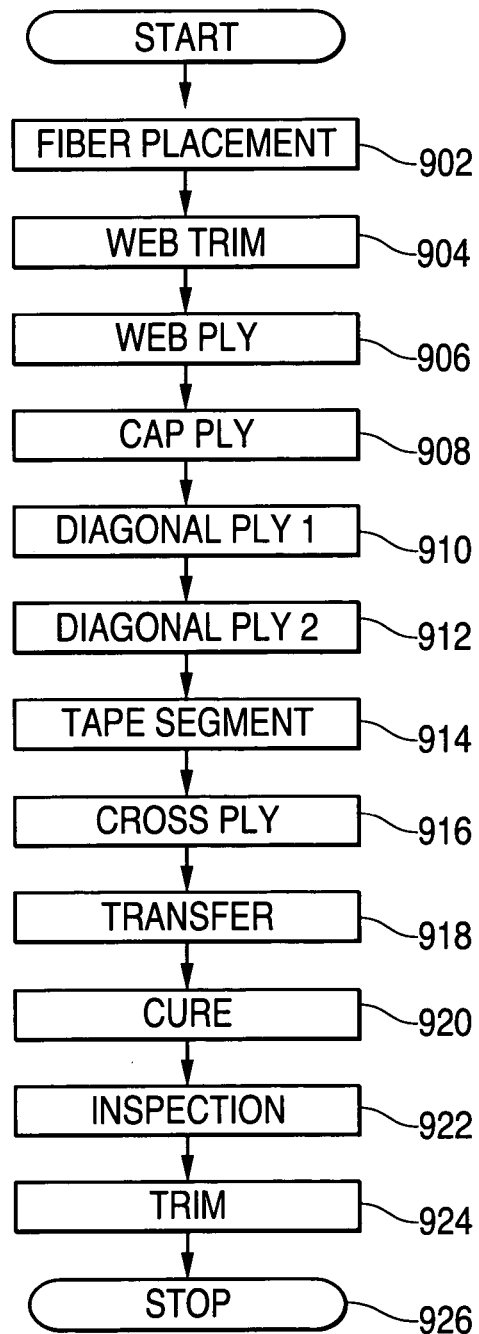

METHOD OF MANUFACTURING CURVED COMPOSITE STRUCTURAL ELEMENTS

FIELD OF THE INVENTION

The present disclosure relates generally to composite structures. More particularly, the present disclosure relates to manufacturing load-carrying structural elements from composite materials.

BACKGROUND OF THE INVENTION

Composite materials have been used increasingly in a variety of industries, including the automotive, marine and aerospace industries. Composite materials have been used to produce nonload-carrying structures, such as boat hulls or automobile body panels. Composite materials have also been applied in the manufacture of load-carrying structures, such as pressure vessels and aircraft fuselages.

Composite materials especially have application in the design of structural members carrying tensile loads. Composite materials used in these designs include strong fibrous materials, such as carbon, aramid, glass or quartz, bonded together with a resin material, such as an epoxy. Such materials can have the advantage of a high tensile strength to weight ratio, permitting the design of lightweight structures having substantial strength in tension. Since the load in these materials is carried primarily by the fibers, a variety of composite materials have been developed with unidirectional fibers, that is, the fibers are substantially aligned in a uniform direction. Thus, these materials are frequently used in designs that place the fibers along the direction of the tensile load in a structural member.

However, the composite material designs can have the disadvantage that the unidirectional fibers do not follow the contour of the structural member. For example, in a structural element that includes a surface that is curved within a plane, the composite material can be trimmed to the shape of the planar arc, but the fibers do not follow the curve of the arc. In such a design, the orientation of the unidirectional fibers does not lie in the direction of loading in the structural member. Furthermore, the unidirectional fibers are severed along the trimmed edge of the curve.

Accordingly, it is desirable to provide a method of manufacturing curved composite structural elements with load-bearing fibers aligned along the curvature of the structural element.

SUMMARY OF THE INVENTION

The foregoing needs are met, to a great extent, by the present invention, wherein in one aspect a method is provided that in some embodiments permits the semi-automated manufacture of curved composite structural elements with load-bearing fibers aligned along the curvature of the structural element using a combination of fiber placement and manual or automated layup processes.

In accordance with one aspect of the present invention, a method of fabricating a composite curved ply can include placing a plurality of contiguously adjoined strips of a composite material in the shape of a planar arc to form a ply. The strips may be placed on a removable substrate material. The composite material can include a plurality of fibers having a general fiber orientation, and the fiber orientation of each of the strips can be substantially aligned along the full length of the planar arc. In addition, the method can include trimming an edge of the ply.

In accordance with another aspect of the present invention, a method of manufacturing a composite curved structural element can include the step of laying up a curved composite web ply including a composite material on a manufacturing tool that includes a curved surface in the shape of a planar arc. The composite material can comprise a plurality of fibers including a general fiber orientation, and the fiber orientation of the web lay can be substantially aligned with a longitudinal centerline of the curved surface. The method further can include the step of curing the web ply.

In accordance with yet another aspect of the present invention, a method of manufacturing a composite curved structural element can include the step of laying up a diagonal ply including a composite material on a manufacturing tool that includes a curved surface in the shape of a planar arc. The composite material can comprise a plurality of fibers including a first fiber orientation and a second fiber orientation. Additionally, the first and second fiber orientations of the diagonal ply can form angles with a tangent of a longitudinal centerline of the curved surface that are approximately constant at all points along the longitudinal centerline. The method further can include the step of curing the web ply.

In accordance with still another aspect of the present invention, a method of manufacturing a composite curved structural element can include the steps of cutting a segment of a composite tape that has a plurality of tape fibers with a general tape fiber orientation and laying up a cross ply including the tape segment on a manufacturing tool. The manufacturing tool can include a curved surface in the shape of a planar arc. Additionally, the tape fiber orientation can substantially form a right angle with a tangent of a longitudinal centerline of the curved surface at all points along the longitudinal centerline.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 9 is a flowchart illustrating steps that may be followed to manufacture a curved composite structural element.

DETAILED DESCRIPTION

An embodiment in accordance with the present disclosure provides a method of manufacturing curved composite structural elements. The method can include fabricating a composite curved web ply using an advanced fiber placement (AFP) machine such that the fiber orientation of the composite material is substantially aligned with the curvature of the structural element. The web ply can then be trimmed and laid up on a manufacturing tool having a curved surface to match the shape of the web ply.

The method also can include laying up a diagonal ply of composite fabric with the fabric fibers oriented at 45 degrees from a tangent of the centerline of the curved surface. The method further can include laying up a cross ply composed of composite tape segments with the tape fibers oriented at a right angle to the tangent of the centerline of the curved surface. In addition, one or both edges of the diagonal ply and the cross ply may be folded over a side of the manufacturing tool to form a cap surface.

Furthermore, the method can include laying up a cap ply composed of composite tape with the fiber orientation aligned with the centerline of a cap surface of the manufacturing tool. The structural element layup may then be sealed in a vacuum bag to allow the composite material to cure, after which the structural element may be inspected and excess material may be trimmed away. This method of manufacture of a composite structural element has an advantage in that the web ply fibers are oriented in alignment with the curvature of the structural element along its entire length.

Figure 1A:
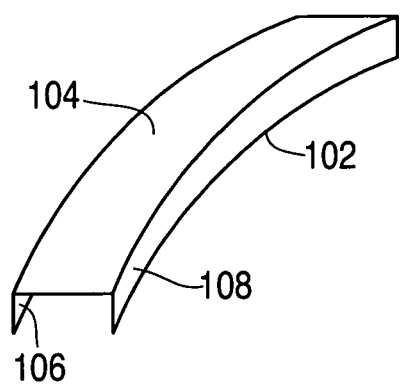
FIG. 1A is a perspective view illustrating a curved structural element with a "C"-shaped cross section.
Figure 1B:
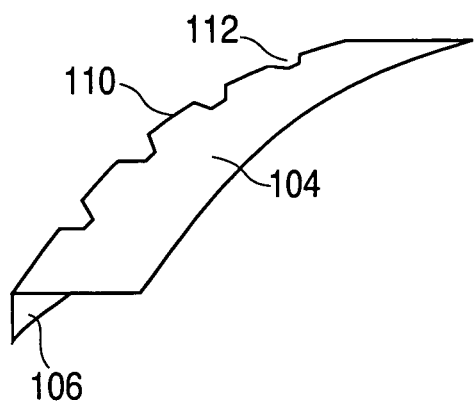
FIG. 1B is a perspective view illustrating a curved structural element with an "L"-shaped cross section.

An embodiment of the disclosure will now be described with reference to the drawing figures, in which like reference numerals refer to like parts throughout. An example of a composite structural element 102 with a curved planar surface, or web surface, 104 and two side, or cap, surfaces 106, 108 forming a "C"-shaped cross section that may be produced by a method of an embodiment of the disclosure is shown in FIG. 1A. Similarly, FIG. 1B shows an example of a composite structural element 110 with a curved planar surface, or web surface, 104 and one flange, side or cap surface 106, including several cutaways, or "mouse holes," 112 that may be produced using a method of an embodiment of the present disclosure. These two exemplary structural elements 102, 110 correspond to an embodiment of a first frame section, or shear tie, (110) and an embodiment of a second frame section, or floating frame, (102) used as structural support elements in an aircraft fuselage. Examples of these components are found in copending U.S. patent application Ser. No. 10/851,381, Biornstad et al., "Composite Barrel Sections for Aircraft Fuselages and other Structures, and Methods and Systems for Manufacturing such Barrel Sections," filed May 20, 2004, and Ser. No. 10/853,075, Johnson et al., "Structural Panels for Use in Aircraft Fuselages and other Structures," filed May 25, 2004, the disclosures of which are hereby incorporated in their entirety. However, alternative embodiments of this disclosure may be used to produce any compatible load carrying element, including stiffeners, beams and frames, such as those used in pressure vessels, other composite containers, boats, trains, submersibles, arches, buildings, bridges, seismic upgrades, window frames or door frames.

In an embodiment of the present disclosure, structural elements are manufactured from a composite material, for example, a polymer matrix, epoxy, BMI or a polyester thermosetting plastic, such as PEEK, PEKK, or PPS reinforced with fibers, such as carbon, aramid, glass, Kevlar, boron, Hybor or quartz, possibly intermixed with metal, metal foil, such as TiGr, or fiber metal laminate. These composite materials generally are "cured" into a stronger form through an endothermic chemical reaction, which requires the addition of energy, for example, by way of heating or irradiation. Examples of composite materials used in various embodiments of this disclosure include graphite fiber reinforced epoxy, fiber reinforced plastic (FRP), glass-fiber reinforced plastic (GRP), carbon-fiber reinforced plastic (CRP), metal matrix composites (MMC), and reinforced carbon-carbon (carbon fiber in a graphite matrix).

Figure 2:
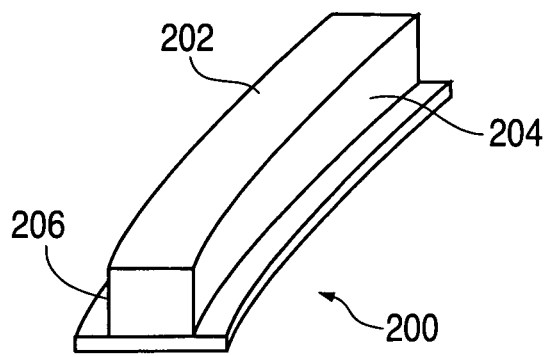
FIG. 2 is a perspective view illustrating a manufacturing tool, or mandrel, in accordance with an embodiment of the method or process.

An embodiment of the present disclosure can include a hand, or manual, layup process, or an automated layup process, wherein a composite material, such as a composite fabric or a composite tape, is placed on a manufacturing tool. An exemplary embodiment of a manufacturing tool, or mandrel 200, is illustrated in FIG. 2. An exemplary mandrel 200 can include a web surface 202, which corresponds to the curved planar surface 104 of the structural element 102, 110 shown in FIG. 1A and FIG. 1B. The exemplary mandrel 200 also can include an inner side, or cap, surface 204; an outer side, or cap, surface 206; or both inner and outer side, or cap, surfaces 204, 206. In other embodiments, the exemplary mandrel 200 can include a near-endless combination of other surfaces.

An embodiment of the present disclosure can include a fiber placement process, in which an advanced fiber placement (AFP) machine can be used to fabricate a curved web ply of a structural element. As known in the art, the fiber placement process typically involves the automated placement of multiple "tows" (that is, untwisted bundles of continuous filaments, such as carbon or graphite fibers, pre-impregnated with a thermoset resin material such as an epoxy commonly known as "prepreg tow") or slit composite tape ("slit tape") onto a manufacturing tool, or mandrel. Conventional fiber placement machines dispense multiple tows to a movable payoff head that collimates the tows (that is, renders the tows parallel) and applies the tows to a mandrel surface using one or more compaction rollers that compress the tows against the surface. A typical tow is between about 0.12 inch and 0.25 inch wide when flattened. In addition, such machines typically include means for dispensing, clamping, cutting and restarting individual tows during placement.

Slit tape is a composite tape that has been slit after being produced in standard widths by the manufacturer. Slitting the tape results in narrower widths that allow enhanced maneuverability and tailoring during application in order to achieve producibility and design objectives. For example, in a particular embodiment, a 12-inch wide tape is cut into ninety-six even slits of ⅛ inch each. Generally, slit tape can have widths varying from about 0.12 inch up to about six inches, and may or may not include backing paper.

Figure 3:
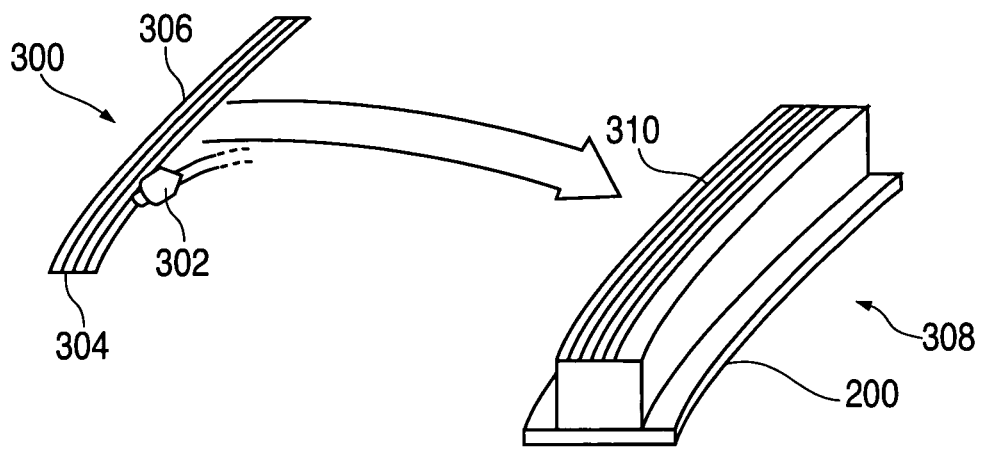
FIG. 3 is a perspective view illustrating a fabrication and layup process of a 0-degree web ply of a composite material.

An exemplary embodiment of a fiber placement process 300 according to the present disclosure is illustrated in FIG. 3. In this exemplary embodiment, an advanced fiber placement (AFP) machine 302 can lay contiguously adjoined strips 304 of a composite material, either slit tape or prepreg tow, in a planar arc 306, that is, in the shape of a curve on a flat surface. As a result, the fibers of the slit tape or tow are oriented in alignment with the longitudinal centerline of the arc along the full length of the curve without distortion of the fibers, such as wrinkles. In a particular embodiment, the curved structural element includes the shape of a planar arc with uniform radius. Nevertheless, other embodiments include structural elements with a curvature of nonuniform radius, or a complex contour that does not lie in a plane. In a particular embodiment of this disclosure, rather than being placed directly onto a mandrel, the strips 304 of composite material are placed over a removable substrate, such as mylar, which may be attached, for example, to a metal caul plate. In an alternative embodiment, the AFP machine 302 can place multiple plies, one over another, creating a thicker grade ply.

Various processes of the present disclosure also can include a web ply trimming process, in which a web ply can be trimmed to remove excess composite and substrate material from the edges of the web ply. For example, in an exemplary embodiment of a web ply trimming process, a numerically-controlled ply cutting machine can cut a web ply to conform to the shape of a perimeter of a possibly curved web surface of a mandrel or other similar manufacturing tool, such as that shown in FIG. 2.

An embodiment of the present disclosure can also include a web ply layup process, in which a web ply is manually or automatically placed on a mandrel, or other manufacturing tool, such as that shown in FIG. 2. An exemplary embodiment of a web ply layup process 308 according to the present disclosure also is illustrated in FIG. 3. In this exemplary embodiment, a web ply 310 such as that fabricated in the fiber placement process 300 can be placed on mandrel 200 using a manual or automated layup process. The web ply 310 can be oriented on the curved web surface 202 of the mandrel such that the composite fibers are aligned with the centerline of the curved surface along the full length of the arc. The web ply 310 is generally referred to as a 0-degree ply, a naming convention referencing the angle of the fibers with respect to the centerline of the surface. The substrate material can then be removed from the surface of the web ply 310. In an alternative embodiment, the web ply 310 can be laid up over a previous ply, which may be a web ply or another type of ply, on the mandrel 200.

Figure 4:
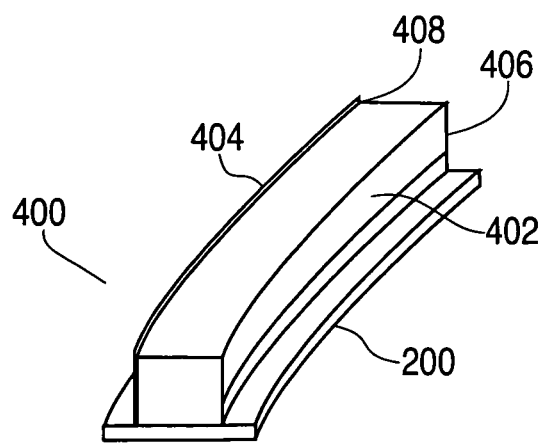
FIG. 4 is a perspective view illustrating the layup of a 0-degree cap ply of a composite material.

In an alternative embodiment of the present disclosure, a cap ply layup process 400, i.e., a process where a cap ply is manually or automatically placed on a mandrel (or other manufacturing tool) such as that shown in FIG. 2, can be used. FIG. 4 depicts an example of a cap ply layup process 400 according to the present disclosure. In this example, a cap ply 402 can be laid up on the exemplary mandrel or other manufacturing tool, such as that shown in FIG. 4. The cap ply 402 can consist of a composite tape, for example, approximately two inches wide, and can be placed on a mandrel 200 such that the orientation of the tape fibers runs in a lengthwise, or substantially 0-degree, direction along the cap surface 106. As further shown in FIG. 4, a single cap ply 402 or 404 can be laid up on one side of the mandrel 200 in order to form an "L"-shaped cross section with a single flange, such as that of the exemplary structural element in FIG. 1B, and a second cap ply 404 or 402 can be applied to the opposite side of the mandrel 200 in order to form a "C"-shaped cross section with two flanges, such as that of the exemplary structural element in FIG. 1A.

In the case of either or both cap plies 402 and 404 splices 406 and 408 can be formed along the corner of the mandrel 200 where the cap ply 402 and 404 meets the web ply 310. In this way, the cap ply or plies 402 and 404 and the web ply form a continuous, substantially 0-degree ply across the web surface 202 and one or both cap surfaces 106 and 108. Since the splices 406 and 408 do not interrupt the 0-degree fibers along the length of the web and cap surfaces, which are designed to carry tensile loads in the longitudinal direction of the web and cap surfaces, the splices 406, 408 do not affect the load-bearing capacity of the structural elements 102 and 110. An alternative embodiment of the disclosure can include 0-degree cap plies 402 and 404, without a 0-degree web ply 310.

Figure 5:
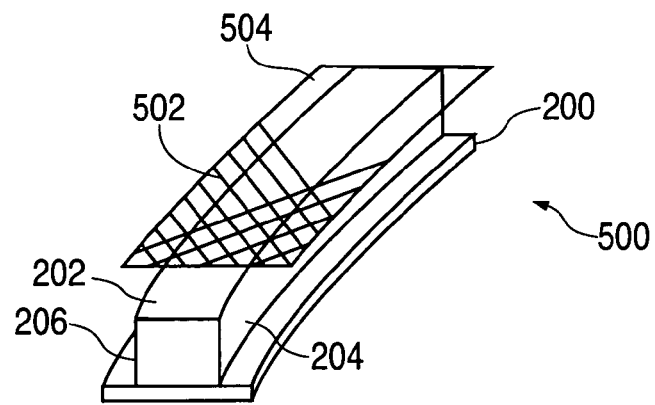
FIG. 5 is a perspective view of the layup of a 45-degree diagonal ply of a composite material on a manufacturing tool.

In yet another exemplary embodiment of the present disclosure, a diagonal ply layup process 500 wherein a diagonal ply can be manually or automatically placed on a mandrel is depicted in FIG. 5. In this example, a diagonal ply 502 can be placed on the mandrel 200 so that the fibers are oriented on the bias at approximately positive (+) and negative (−) 45 degrees from the centerline of the web surface of the mandrel 200. The composite fabric 504 in a present embodiment is a prepreg composite fabric pre-impregnated with a resin. However, in other embodiments, the composite fabric 504 may include any suitable type of composite fabric, including a dry form composite fabric. Although the diagonal ply shown in FIG. 5 includes a sheet of composite fabric 504, an alternative embodiment can include a diagonal ply formed from strips of composite tape laid up on the mandrel 200 so that the tape fibers are oriented at approximately +45 degrees or −45 degrees from the centerline of the web surface of the mandrel. Furthermore, alternative embodiments can include a diagonal ply with the fibers oriented on a bias at any angle between 0 and 90 degrees from the centerline of the web surface, for example, at positive and negative 60 degrees.

In order to form the flange, side, or cap, surfaces of the structural element, the material of the diagonal ply 502 is cut wider than the web surface 202 of the mandrel 200 so that at least one edge of the diagonal ply 502 can be folded over the side of the mandrel 200. A single edge of the diagonal ply 502 can be folded over the outer cap surface 206 of the mandrel 200 in order to form an "L"-shaped cross section, such as that of the example structural element shown in FIG. 1B. Alternatively, in order to prevent or minimize wrinkling, the diagonal ply 502 can be first placed on the inner cap surface 204 of the mandrel 200 and then folded over the curved web surface 202 by tensioning and uniformly spreading the fibers across the curved web surface 202 to form an "L"-shaped cross section. In addition, the diagonal ply 502 optionally can be folded over the outer cap surface 206 of the mandrel 200, in order to form a "C"-shaped cross section, such as that of the example structural element shown in FIG. 1A. Similarly, the diagonal ply 502 can be first placed on the curved web surface 202 by tensioning and uniformly spreading the fibers across the curved web surface 202 and then folded over the outer cap surface in order to form an "L"-shaped cross section, such as that of the example structural element shown in FIG. 1B.

Figure 6:
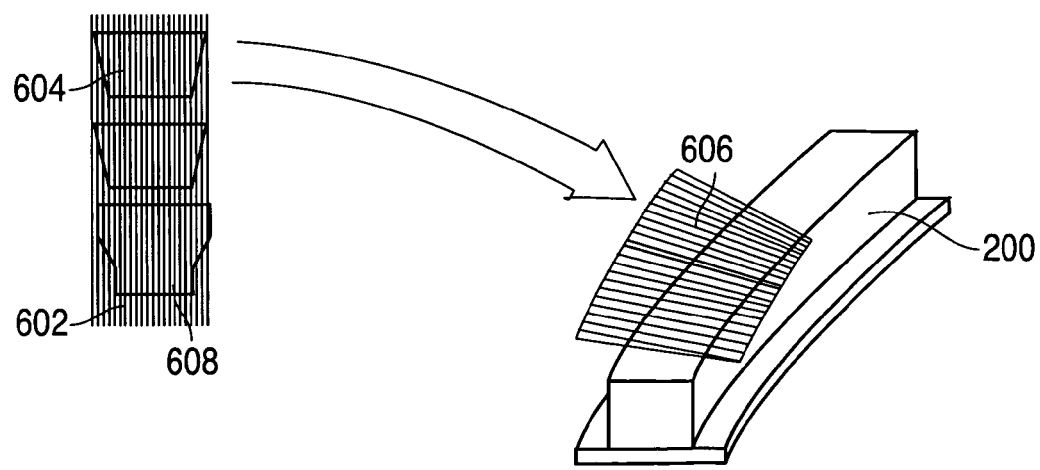
FIG. 6 is a perspective view illustrating the layup of a 90-degree cross ply of a composite material.

Other embodiments of the present disclosure can include a cross ply layup process 600, i.e., a process where a ply is placed in a fashion similar to that shown in FIG. 6. First, a unidirectional composite tape 602 is cut into segments. For example, the tape can be cut into trapezoidal segments 604, as shown in FIG. 6. For the purposes of this disclosure, the term "trapezoidal" is used in the sense of its common meaning in American English, with reference to a quadrilateral having only two sides parallel, as opposed to the common meaning in British English, with reference to a quadrilateral having no two sides parallel. The term commonly used in British English for a quadrilateral having only two sides parallel is "trapezium."

Returning to FIG. 6, the two non-parallel sides of the trapezoidal tape segments 604 can be cut at an angle such that when laid up on the mandrel 200 the two non-parallel edges of the tape segment will be substantially perpendicular to the tangent of the longitudinal centerline of the curved or web surface 202 of the mandrel 200. The tape segments 604 then can be laid up on the exemplary mandrel 200 in order to form a cross ply 606 with fibers oriented approximately at a right angle with the centerline of the web surface 202 of the mandrel 200, without forming wrinkles in the tape segments 604.

As in the diagonal ply example described above, the cross ply 606 can be cut wider than the web surface of the mandrel 200 such that one or two edges of the cross ply 606 can be folded over the side or sides of the mandrel 200 in order to form flange, side, or cap, surfaces. In one embodiment, the tape can be cut into modified "funnel" shape segments 608, such that the edge or edges of the tape segment 608 that fold over the cap surfaces 204, 206 of the mandrel 200 have parallel sides and the portion over the web surface 202 of the mandrel 200 has nonparallel sides. In an alternative embodiment, the tape can be cut into rectangular segments and allowed to overlap or to form gaps between the tape segments when laid up on the mandrel 200. Once again, in this way a "C"-shaped cross section or an "L"-shaped cross section can be formed.

Alternatively, in order to prevent or minimize wrinkling, the cross ply 606 can be first placed on the inner cap surface 204 of the mandrel 200 and then folded over the curved web surface 202 by tensioning and uniformly spreading the fibers across the curved web surface 202 in order to form an "L"-shaped cross section. In addition, the cross ply 606 optionally can also be folded over the outer cap surface 206 of the mandrel 200, in order to form a "C"-shaped cross section, such as that of the example structural element shown in FIG. 1A. Similarly, the cross ply 606 can be first placed on the curved web surface 202 by tensioning and uniformly spreading the fibers across the curved web surface 202 and then folded over the outer cap surface in order to form an "L"-shaped cross section, such as that of the example structural element shown in FIG. 1B.

Figure 7:
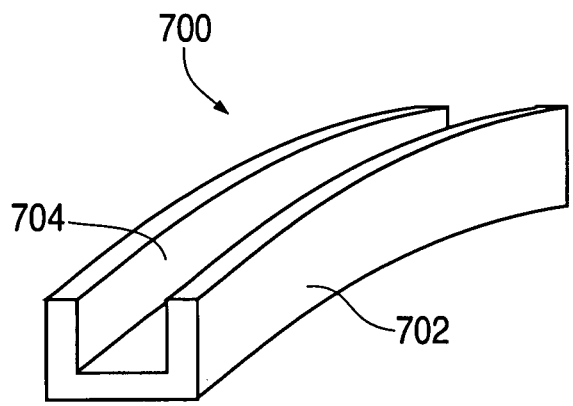
FIG. 7 is a perspective view illustrating a structural element layup that has been transferred onto a concave manufacturing tool.

FIG. 7 illustrates a transfer process 700, in which a structural element layup is transferred from a convex mandrel (or other manufacturing tool) to a concave manufacturing tool 702. In the present example of FIG. 7 a concave manufacturing tool 702, or female mandrel, is illustrated. In this example, structural element plies previously allowed to cure as laid up on a convex manufacturing tool, such as the exemplary mandrel 200 of FIG. 2, may be optionally transferred to a concave manufacturing tool 702 for curing. In the present embodiment the concave manufacturing tool 702 conforms to the external surface of the structural element layup.

In an alternative embodiment, plies can be laid up directly on a concave manufacturing tool, such as that shown in FIG. 7, rather than being laid up on a convex manufacturing tool. In this case, the plies can be allowed to cure as laid up on the concave manufacturing tool, or optionally transferred to and cured on a convex tool.

Figure 8:
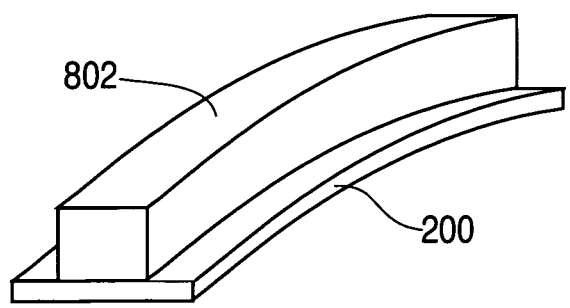
FIG. 8 is a perspective view illustrating the enclosure of a structural element layup in a sealed vacuum bag for curing.

Another exemplary process of the present disclosure can include a sealing process, in which a structural element layup is sealed inside a vacuum bag in order to remove trapped air from inside and underneath a composite material, between layers of composite plies and between a composite material and a respective mandrel. An exemplary embodiment of a vacuum bag 802 encasing a structural element on an exemplary mandrel 200 layup is illustrated in FIG. 8. Similarly, a exemplary embodiment of a vacuum bag 704 encasing a structural element layup on a concave manufacturing tool 702 is illustrated in FIG. 7.

FIG. 9 is a flowchart outlining an exemplary method according to the present disclosure for manufacturing a curved composite structural element. The process starts in step 902 where an advanced fiber placement (AFP) machine lays contiguously adjoined strips of a composite material. As discussed above, in various embodiments the composite material can be in the form of either slit tape or prepreg tow. Additionally, as discussed above, the AFP machine can place the strips in any number of viable or useful shapes, such as the exemplary planar arc shown in FIG. 3, with the fibers of the slit tape or tow oriented in alignment with the longitudinal centerline of the arc along the full length of the curve, without distortion of the fibers, such as wrinkles. As further discussed above, the strips of composite material can be placed over a removable substrate, such as mylar. Furthermore, in an alternative embodiment the AFP machine can place multiple plies, one above another, creating a thicker grade ply. The process continues to step 904.

In step 904, a web ply can be trimmed to remove excess composite and substrate material from the edges of the web ply. In this step, a numerically-controlled ply cutting machine can cut the web ply to the shape of the perimeter of the web, or curved, surface of a mandrel, or other similar manufacturing tool, such as that shown in FIG. 2. Next, in step 906, web ply can be laid up on a mandrel, or other similar manufacturing tool, such as that shown in FIG. 2. The web ply can be laid up using a manual or automated layup process, orienting the composite fibers in a 0-degree direction aligned with the centerline of the curved web surface of the mandrel or other tool along the full length of the arc, such as the web ply shown in FIG. 3. In addition, the substrate material can be removed from the surface of the web ply during this step. In various embodiments, a web ply can be laid up directly on the mandrel or other tool, or alternatively, over a previous ply or combination of plies on the mandrel or other tool. In addition, various embodiments may include more than one web ply in combination with other plies. The process continues to step 908.

In step 908, a cap ply can be manually or automatically laid up on a manufacturing tool, such as the mandrel shown in FIG. 2. As discussed above, the cap ply can consist of composite tape, and can be placed on the mandrel or other tool such that the orientation of the tape fibers runs in a lengthwise, or 0-degree, direction along the cap surface, such as the exemplary cap ply layup shown in FIG. 4. A single cap ply can be laid up on one side of the mandrel or tool in order to form an "L"-shaped cross section with a single flange, such as that of the example structural element shown in FIG. 1B, plus a second cap ply can be applied to the opposite side of the mandrel in order to form a "C"shaped cross section with two flanges, such as that of the example structural element shown in FIG. 1A, forming a continuous 0-degree ply across the web surface and one or both cap surfaces. In various embodiments, a cap ply can be laid up directly on the mandrel or other tool, or alternatively, over a previous ply or combination of plies on the mandrel or other tool. In addition, various embodiments may include more than one cap ply in combination with other plies. The process continues to step 910.

In step 910, a +/−45-degree diagonal ply of composite fabric can be manually or automatically laid up on a mandrel, or other similar manufacturing tool, such as that shown in FIG. 2. The diagonal ply can be placed on the mandrel or other tool so that the fabric fibers are oriented at approximately +/−45 degrees from the centerline of the web surface of the mandrel or other tool, such as the diagonal ply shown in FIG. 5. As discussed above, in various embodiments the composite fabric can take the form of any suitable composite fabric, including a prepreg composite fabric pre-impregnated with a resin. In various embodiments, a diagonal ply can be laid up directly on the mandrel or other tool, or alternatively, over a previous ply or combination of plies on the mandrel or other tool. In addition, various embodiments may include more than one diagonal ply in combination with other plies. The process continues to step 912.

In step 912, in order to form side, or cap, surfaces of the structural element the composite fabric of the diagonal ply can be cut wider than the web surface of the mandrel or other tool so that at least one edge of each diagonal ply can be folded over the side of the mandrel or other tool. A single edge of the diagonal ply can be folded over one side of the mandrel or other tool in order to form an "L"-shaped cross section, such as that of the example structural element shown in FIG. 1B, or two edges of the diagonal ply can be folded over two sides of the mandrel or other tool in order to form a "C"-shaped cross section, such as that of the example structural element shown in FIG. 1A. Alternatively, in order to prevent or minimize wrinkling of the composite fabric over the inner cap surface of the mandrel, the diagonal ply can be first adhered to the inner cap surface and then folded over the web surface, stretching the composite fabric as necessary to prevent or minimize wrinkling on the cap surface or on the web surfaces. In addition, the diagonal ply can then be folded over the outer cap surface, stretching the composite fabric as required to prevent or minimize wrinkling on the web surface or on the outer cap surface. The process continues to step 914.

In step 914, a unidirectional composite tape can be cut into segments, such as the exemplary tape segments shown in FIG. 6. Next, in step 916, the tape segments can be manually or automatically laid up on a mandrel or other similar manufacturing tool. As discussed above, the fibers of the tape segments can be aligned at substantially 90 degrees with the centerline of the web surface of the mandrel or other tool in order to form a 90-degree cross ply. In the case of trapezoidal or modified "funnel" shape tape segments, the fibers can be oriented approximately at a right angle with the centerline of the web surface of the mandrel or other tool, without overlapping or creating gaps between the tape segments, and without forming wrinkles in the tape.

As in the case of the diagonal ply above, the cross ply can be cut wider than the web surface of the mandrel or other tool, and one or two edges of the cross ply can be folded over the side or sides of the mandrel or other tool in order to form side or cap surfaces. Once again, in this way a structural element with a "C"-shaped cross section or an "L"-shaped cross section can be formed. In various embodiments, a cross ply can be laid up directly on the mandrel or other tool, or alternatively, over a previous ply or combination of plies on the mandrel or other tool. In addition, various embodiments may include more than one cross ply in combination with other plies. The process then continues to step 918.

In step 918, the structural element layup may optionally be transferred to a concave manufacturing tool, e.g., a female mandrel. As discussed above, the concave tool or mandrel can conform to the external surface of the structural element layup, as shown in FIG. 7. Next, in step 920, the structural element layup can be allowed to cure while sealed inside a vacuum bag on a mandrel or other tool, as shown in FIG. 8, or on a concave tool or mandrel, as shown in FIG. 7. As discussed above, the vacuum can remove trapped air from inside the composite material and from underneath the composite material, between layers of the composite plies and between the composite material and the mandrel. The process continues to step 922.

In step 922, after the structural element layup has cured, it can be inspected to verify compliance with the design specifications. Next, in step 924, the structural element layup can be trimmed, if necessary, to remove any excess material. In addition, cutouts, or "mouse holes," such as those shown in FIG. 1B, can be trimmed into the structural element. Control continues to step 926 where the process stops.

The example embodiment of the flowchart in FIG. 9 described above includes only one web ply, one cap ply, one diagonal ply, and one cross ply. However, other embodiments may include any number of plies in any combination laid up in any order. For example, a floating frame with a "C"-shaped cross section, such as the exemplary structural element shown in FIG. 1A, can include eighteen plies on the web surface and twenty-eight plies on each of the two cap surfaces. In this embodiment, the method could include laying up half of the plies in the following order:

a 45-degree diagonal ply on the web and both cap surfaces
a cap ply on each of the two cap surfaces
an additional cap ply on each of the two cap surfaces
a web ply on the web surface and a cap ply on the two cap surfaces
a 45-degree diagonal ply on the web and cap surfaces
a cap ply on each of the two cap surfaces
an additional cap ply on each of the two cap surfaces
a 45-degree diagonal ply on the web and cap surfaces
a cross ply on the web and cap surfaces
a 45-degree diagonal ply on the web and the cap surfaces
a cap ply on each of the two cap surfaces
a 45-degree diagonal ply on the web and cap surfaces
a cross ply on the web surface and on the two cap surfaces
a 45-degree diagonal ply on the web and cap surfaces The second half of the plies on the web surface and each of the cap surfaces in this example could then be laid up on the mandrel in the opposite order of the first half to form a mirror image, or symmetrical, layup order, for a total of eighteen plies on the web surface and twenty-eight plies on each of the two cap surfaces.

Another example structural element with a "C"-shaped cross section, such as the exemplary structural element shown in FIG. 1A, can include the same ply combination as the previous example, except that the two longitudinal extremes of the web surface each can include an additional ten plies covering the last twelve inches of the web surface at each extreme of the structural element. In this embodiment, two additional diagonal plies can be laid up on the web surface at each extreme of the structural element simultaneously with the two cap plies after the first 45-degree diagonal ply, and before the first 0-degree web ply, of the previous example.

In addition, two additional cross plies can be laid up on the web surface at each extreme of the structural element simultaneously with the two cap plies after the second diagonal ply, and before the third diagonal ply, of the previous example. Furthermore, a 0-degree web ply can be laid up simultaneously with the cap ply before the final three plies of the previous example. Similarly, a symmetrical ply order can be obtained by laying up an additional 0-degree web ply, two additional cross plies, and two additional diagonal plies in the opposite order between the second half plies of the previous example.

In this last example, each of the additional plies (of the first half of the symmetrical layers) can extend, for example, one half inch farther toward the center of the structural element than the previous. That is, for example, the first additional 45-degree diagonal ply can extend twelve-and-a-half inches from each end of the structural element layup; the second additional 45-degree diagonal ply can extend thirteen inches from each end of the layup; the first additional cross ply can extend thirteen and a half inches from each end of the layup; the second additional cross ply can extend fourteen inches from each end of the layup; and the additional web ply can extend fourteen-and-a-half inches from each end of the layup. In order to form a symmetrical, or mirror image, layup order, the five additional plies of the second half of the symmetrical layers each can extend one half inch less than the previous.

As a further example, a shear tie with an "L"-shaped cross section, such as the exemplary structural element shown in FIG. 1B can include twenty-four plies. In this embodiment, the method can include laying up half of the plies in the following order:
- a 45-degree diagonal ply on the web and both cap surfaces
- a cross ply on the web and cap surfaces
- a 45-degree diagonal ply on the web and cap surfaces
- a web ply on the web surface and a cap ply on the two cap surfaces
- a 45-degree diagonal ply on the web and the cap surfaces
- a cross ply on the web surface and on the two cap surfaces
- a 45-degree diagonal ply on the web and the cap surfaces
- a web ply on the web surface and a cap ply on the two cap surfaces
- a 45-degree diagonal ply on the web and cap surfaces
- a cross ply on the web surface and on the two cap surfaces
- a 45-degree diagonal ply on the web and cap surfaces
- a web ply on the web surface and a cap ply on the two cap surfaces The second half of the plies in this example can then laid up on the mandrel in the opposite order of the first half to form a mirror image, or symmetrical, layup order, for a total of twenty-four plies on the web surface and on each of the two cap surfaces.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method comprising the steps of:
    forming a 0-degree, planar curved web ply of contiguous, adjoined fiber composite strips by placing the strips to lay contiguously adjoined on a flat surface and in the shape of a planar arc so that the fibers are in a 0-degree direction aligned with a full length of a longitudinal centerline of the planar arc without distortion;
    trimming the web ply to conform to the shape of a perimeter of a planar curved web surface of a mandrel, said mandrel having first and second side cap surfaces which meet the web surface to form first and second corners respectively;
    laying up the web ply onto the web surface of the mandrel to have 0-degree fiber orientation substantially aligned with the full length of a longitudinal centerline of the web surface; and
    laying up a 0-degree cap ply of fiber composite tape onto the first cap surface to form a splice with the web ply along the first corner of the mandrel, the tape comprising a plurality of tape fibers having 0-degree fiber orientation substantially aligned with a longitudinal centerline of the first cap surface, and the splice forming a continuous, substantially 0-degree ply lying across the web surface and the first cap surface.

2. The method of claim 1, further comprising laying up a 0-degree cap ply of fiber composite tape onto the second cap surface to form a second splice with the web ply along the second corner of the mandrel, the tape comprising a plurality of tape fibers having 0-degree fiber orientation substantially aligned with a longitudinal centerline of the second cap surface, and the second splice forming a continuous, substantially 0-degree ply lying across the web surface and the first and second cap surfaces.

3. The method of claim 2, further comprising forming a curved composite structural element by curing the resulting layup comprising the splices.

4. The method of claim 3, wherein the curved composite structural element is an aircraft structural member.

5. The method of claim 4, wherein the aircraft structural member is a floating frame.

6. The method of claim 3, wherein the curved composite structural element comprises a C-shaped cross section.

7. The method of claim 1, further comprising forming a curved composite structural element by curing the resulting layup comprising the splice.

8. The method of claim 7, wherein the curved composite structural element is an aircraft structural member.

9. The method of claim 8, wherein the aircraft structural member is a shear tie.

10. The method of claim 7, wherein the curved composite structural element comprises an L-shaped cross section.

11. The method of claim 1, wherein each strip is a slit composite tape.

12. The method of claim 1, wherein each strip is a prepreg tow.

13. The method of claim 1, wherein the web ply is formed on a removable substrate material.

14. The method of claim 13, further comprising removing the removable substrate material from the trimmed web ply subsequent to laying up the web ply on the web surface of the mandrel.

15. The method of claim 1, further comprising laying up a diagonal ply over the web surface of the mandrel.

16. The method of claim 15, further comprising laying up a cross ply over the web surface of the mandrel.

17. The method of claim 16, further comprising the steps of:
    sealing the resulting layup comprising the splice, the diagonal ply, and the cross ply within a vacuum bag to remove trapped air; and
    forming a curved composite structural element by curing the sealed layup.

18. The method of claim 17, further comprising inspecting the curved composite structural element for defects.

19. The method of claim 18, further comprising trimming the curved composite structural element.

20. The method of claim 1, further comprising the steps of:
    sealing the resulting layup comprising the splice within a vacuum bag to remove trapped air; and
    forming a curved composite structural element by curing the sealed layup.

21. The method of claim 20, further comprising inspecting the curved composite structural element for defects.

22. The method of claim 21, further comprising trimming the curved composite structural element.

23. The method of claim 1, further comprising the step of transferring the resulting layup comprising the splice onto a curved, concave manufacturing tool, the curved, concave manufacturing tool having a shape conforming to an external surface of the resulting layup.

24. The method of claim 11, wherein each strip is ⅛ inch wide.

25. The method of claim 12, wherein each strip is between 0.12 inch and 0.25 inch wide when flattened.

* * * * *